Feb. 26, 1935.   J. D. COCKCROFT ET AL   1,992,908
SYSTEM FOR THE VOLTAGE TRANSFORMATION OF DIRECT CURRENT ELECTRICAL ENERGY
Filed Jan. 20, 1933   2 Sheets-Sheet 1

Inventors:
John D Cockcroft,
Ernest T. S. Walton,
by Charles T. Mulla
Their Attorney.

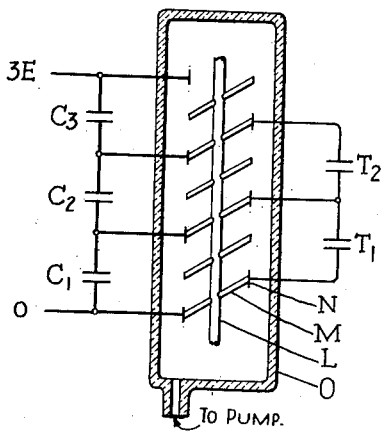
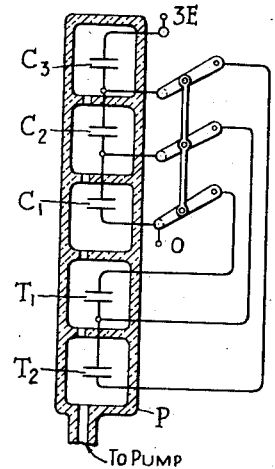
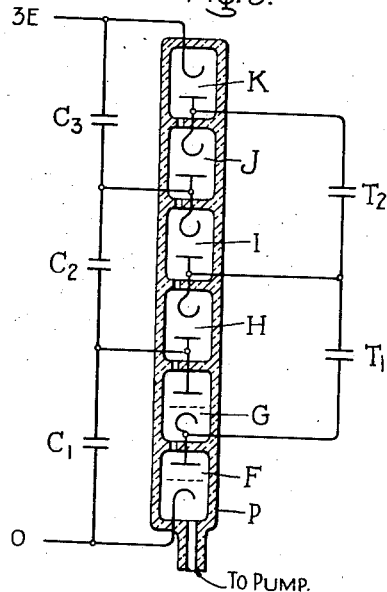
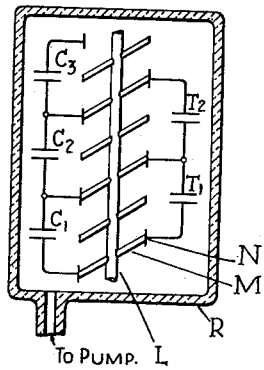

Patented Feb. 26, 1935

1,992,908

UNITED STATES PATENT OFFICE 1,992,908

SYSTEM FOR THE VOLTAGE TRANSFORMATION OF DIRECT CURRENT ELECTRICAL ENERGY

John Douglas Cockcroft and Ernest Thomas Sinton Walton, Cambridge, England

Application January 20, 1933, Serial No. 652,750
In Great Britain January 23, 1932

12 Claims. (Cl. 171—97)

This invention relates to a system for the voltage transformation of direct current electrical energy and the main object is the obtaining of direct current at very high voltages and also the subsequent reduction of the voltage in a simple, economical and efficient manner, that is to say, by the use of comparatively simple apparatus which moveover need not be subjected to inconveniently high electrical stresses. The invention however is not limited to the transforming of energy at very high voltages.

A common method of obtaining high voltage direct current includes the rectification of alternating current which has been stepped up to the required high alternating voltage by means of a transformer or by means of a system of cascade-connected transformers.

Systems have also been evolved wherein the required high voltage of direct current is obtained by means of cascade-connected groups of transformers, rectifiers and condensers such as set forth for example in the specification of British Letters Patent No. 255,879.

Other systems have been proposed wherein a single alternating current transformer feeds a cascade connected system of condensers and rectifiers arranged so that in effect the charge given to one condenser from the transformer is repeatedly added to that of the next condenser in the manner set forth for example in the specification of British Letters Patent No. 367,785.

No satisfactory way appears to have been evolved for transforming very high voltage direct current energy down to conveniently low voltages.

The present invention permits the transformation of direct current energy by an arrangement or combination of condensers and switching devices such that when the system is connected to a direct current source almost any desired higher or lower voltage can be obtained without any condenser or switching device being subjected to a higher voltage than that of said source when the voltage is being stepped-up or than said lower voltage when the voltage is being stepped down, as will hereinafter appear. The invention also permits the transmission of a greater amount of energy, for a given aggregate of condensers and switching devices, than is possible with the prior arrangements including that of the specification of British Letters Patent No. 367,785 aforesaid.

The system of the present invention comprises basically a capacitative potential divider to the whole or a part of which direct current energy is adapted to be supplied, one of more auxiliary or transfer condensers, and switching means for alternately connecting each auxiliary or transfer condenser across different parts of said potential divider so as to transfer energy along the latter divider whereby the direct current energy may be drawn from another part or the whole, respectively, of the potential divider at a lower or higher voltage.

According to another feature of the invention the switching is effected at a high frequency, that is, a frequency which is as high as can conveniently be obtained. Mechanical switches such as of the commutator type may be used, preferably operating in vacuum. However, such high switching frequency may be obtained by the use of thermionic devices. Thus by the use of grid controlled vapor electric devices a switching frequency of at least 10,000 per second may be attained, while with high-vacuum triodes switching frequencies of the order of 1,000,000 or more may be employed. It will be appreciated that the capacity of the condensers will be inversely proportional to the switching frequency while for a given condenser capacity the fluctuation in the voltage of the transformed energy falls with increase in switching frequency. Thus, for example, assuming a permissible 5 per cent output voltage fluctuation due to the discharging of the condensers, and neglecting losses, if 100,000 kilowatts of direct current energy are to be transformed from 100,000 volts to 500,000 volts the potential divider may comprise five similar condensers each of 0.04 microfarad capacity with a switching frequency of 1,000,000 per second, the transfer condensers which may be four in number, each being also of 0.04 microfarad capacity. The condensers may be of high voltage bushing type such as are obtainable on the market or they may be of the high-vacuum type and located in chambers which are continuously evacuated during the operation of the system. Thus, the group of condensers of the potential divider and the group of transfer condensers may each be located in a vitreous chamber preferably in the form of a tube or a group of aligned tubular portions substantially in the manner described in the specification of British Letters Patent No. 366,561, such tube being connected at one point such as the end to the evacuating pump.

It will be seen hereinafter that certain of the switching means may be simple electric unidirectionally conductive devices or valves, such as thermionic diode rectifiers, which may be arranged in line in a vitreous tube or group of aligned tubular portions which is continuously evacuated during operation as described in the specifications just above mentioned. Alternatively the valves may be of the mercury vapour rectifier type.

Obviously two or more condensers may be used in parallel as also may the rectifiers if a greater capacity is required than can conveniently be provided by a single condenser or rectifier.

Our invention will be better understood from the following description when considered in connection with the accompanying drawings and its scope will be pointed out in the appended claims.

Referring to the drawings:—

Fig. 2 is a diagram of a system in accordance with the invention for providing a step-up in voltage, the switching means being thermionic tubes or the like.

Fig. 4 is a semi-diagrammatic illustration of a modification of the system shown in Fig. 1, the mechanical switching means being enclosed within an evacuated container.

Fig. 5 illustrates a modification of the system shown in Fig. 2, the thermionic tubes being enclosed within an evacuated container.

Fig. 6 illustrates a modification of the system shown in Fig. 1, the potential divider and transfer condensers being enclosed within an evacuated container.

Fig. 7 illustrates a modification of the system shown in Fig. 1, a commutator type switch such as shown in Fig. 4 and the potential divider and transfer condensers all being enclosed within an evacuated container.

Figure 1:
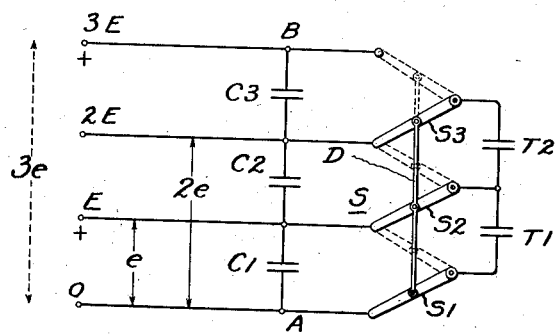
Figure 1 is a diagram of an elementary form of the system employing mechanical switching means for stepping up or stepping down the voltage.

Referring first to Fig. 1 of the drawings, let it be supposed that O and E represent the terminals of a source of direct current having a voltage $e$ while O and 3E represent the terminals of a direct current output or load circuit to be supplied with current, from the source connected to O, E, at the stepped-up voltage of $3e$. AB represents the capacitative potential divider comprising in the example three series-connected condensers C1, C2 and C3 which preferably have the same capacity. T1 and T2 represent transfer condensers. S represents the mechanical switching means for providing the alternate connections of the condensers T1 and T2 across the condensers C1, C2 and C3 of the potential divider A2, as will now be explained, the transfer condensers T1 and T2 being conveniently connected in series.

The switching means S has three similar arms S1, S2 and S3 pivotally or resiliently connected respectively to the terminals of the transfer condensers T1 and T2, said three switch arms being simultaneously operable by means, for example, of the insulating bar D, from the illustrated positions wherein the switch arms are respectively in electrical connection with the three terminals O, E and 2E, to the dotted line positions wherein the switch arms are respectively in electrical connection with the three terminals E, 2E and 3E. The switch arms may be moved by a vibrator, or they may be moved by rotating or other convenient means. The contacts and switch arms may be of commutator or other convenient form, while preferably being capable of operation at high frequency. The switching means S may in fact be arranged in an evacuated chamber. In certain applications of the invention all the condensers and the switching means may be arranged in a single chamber which is adapted to be continuously evacuated during operation, and the load, such as an X-ray tube, may be disposed in the same chamber.

With the switching means S in the illustrated full line position and assuming that energy is available from the source of direct current connected to O, E, the transfer condenser T1 will become charged from this source to a voltage $e$, that is to say, current will flow into the condenser T1. If now the switch is moved over to the dotted line position the transfer condenser T1 will discharge into the potential divider condenser C2 and both condensers T1 and C2 will rapidly assume a potential $e/2$, in the simple case where the capacity T1 is equal to each of the capacities C1, C2 and C3. If now the switch S is moved back to the full line position, energy will flow into the condenser T1 from the source connected to O, E and T1 will become charged again at the potential $e$. Upon the switch S assuming again the dotted line position, energy from the condenser T1 will flow into the condenser C2. If the condenser T2 and the switch arm S3 were absent from the system shown in Fig. 1 the condensers T1 and C2 would be charged at a potential $3e/4$. After a series of oscillations of the switch S during which, it is assumed, no energy is withdrawn from the terminal 2E, the condenser C2 would then become charged nearly to the potential $e$, whereupon energy could be drawn from the terminals E and 2E at a voltage nearly equal to $e$, namely that of the source of supply connected to O, E. Also energy could be drawn from the terminals O, 2E at a voltage of nearly $2e$.

However, in the actual system shown in Fig. 1 which includes the condenser T2, the condenser C3 and the switch arm S3 with the initial conditions, namely the conditions during the first few oscillations of the switch S, are slightly different than those obtaining in the above-assumed system. In the actual system shown in Fig. 1, when the switch S returns for the first time to the illustrated full-line position the condenser C2, at this time charged at a voltage $e/2$, is placed in connection with the second transfer condenser T2. These two condensers C2 and T2 assume a steady voltage of $e/4$, in the simple case wherein the capacity of T2 is equal to that of C2. Therefore, when the switch S assumes for the second time the dotted line position, the transfer condenser T1, charged at a voltage $e$, is connected to the condenser C2, charged at the voltage $e/4$, the condensers T1 and C2 now carrying the same charge at a voltage $5e/8$. Simultaneously with the assumption for the second time by switch S of the dotted line position the condenser T2 discharges into the condenser C3, and these two condensers then assume a charge at a voltage $e/8$. When the switch S returns once more to the full-line position, the transfer condenser T1 again becomes charged at a voltage $e$, and on the switch S being thrown over for the third time to the dotted-line position the condensers T1 and C2 assume a steady charge at a voltage $13e/16$.

Upon further oscillation of the switch S without withdrawal of energy, it will be readily appreciated that after a short time the condensers C2 and C3 in a steady state will each be charged at nearly $e$ volts. The actual voltage of each of the condensers C2 and C3 will fluctuate by reason of their being alternately charged and discharged, the amount of fluctuation, however, being inversely proportional to the frequency of operation of the switch S. Thus energy may be drawn from the terminals O, 3E at a voltage of nearly 3e, and from the terminals E, 3E at a voltage of nearly 2e.

It will be obvious that the number of condensers included in the potential divider AB may be increased provided the number of transfer condensers is correspondingly increased. It will also be appreciated that the condenser C1 is actually required only if energy is to be drawn from the terminal O on the one hand and from either of the terminals 2E or 3E on the other hand. While in the most convenient arrangement illustrated by Fig. 1 of the drawings there are N condensers constituting the potential divider AB and N—1 transfer condensers, the invention is not limited to such particular arrangement as it is believed that the principle of the invention could be applied in other ways.

The condensers C1, C2, C3, T1 and T2 are conveniently all of the same capacity, and it will be appreciated that none of these condensers is called upon to withstand a voltage greater than e. Obviously however the capacity of the condensers T1 and T2 need not be equal to that of the condensers C1, C2 and C3.

Figure 2:
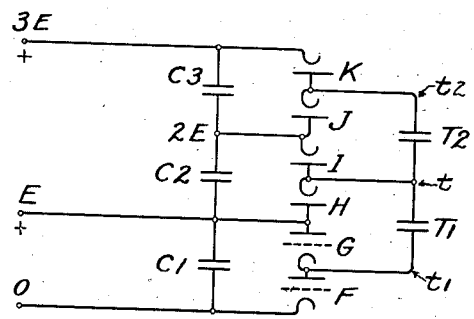

Referring next to Fig. 2 of the drawings, the arrangement is the same in principle as that shown in Fig. 1, but the switch arm S1 is replaced by two 3-electrode thermionic valve devices F and G, the grid potentials of which are varied appropriately to cause the valves F and G to become conductive alternately, thereby connecting conductively the lower terminal of the transfer condenser T1 alternately to the terminal O and the terminal E. For this purpose the grids may be connected or inductively coupled to an oscillator system of relatively small power. The devices F and G may be of the highly evacuated triode type or they may be grid controlled vapor electric devices. In the latter case the cut-off may take place by reason of the anode and cathode assuming the same potential when the condenser T1 charges or discharges, or the cut-off may be effected by other convenient means.

In Fig. 2 the switch arms S2 and S3 shown in Fig. 1 are replaced by four unidirectionally conductive devices H, I, J and K which may be thermionic diodes, or mercury vapour rectifiers or other rectifiers. The conductive devices H, I, J and K have inherently a high resistance in the direction KH and a low resistance in the direction HK. With such arrangement, owing to the positive control provided by the 3-electrode valves F and G, it will be appreciated that the rectifier devices H, I, J, K operate completely automatically and statically to perform the transfer functions of the switch arms S2 and S3 in the arrangement illustrated by Fig. 1. This result follows from the fact that when the valve F is caused to become conductive, the potential of the point t will be lower than the potential of E, so that the valve H is then conducting. At the same time the potential of the point t2 is lower than the potential of 2E, so that valve J is then also conducting. This operating condition in the system shown in Fig. 2, therefore, corresponds to the operating condition in the system shown in Fig. 1 when the position of the switches in Fig. 1 is as shown by the full lines.

Now when valve F is made non-conductive and valve G is made conductive, the potential of E will be greater than the potential of t1 and current will flow through valve G equalizing the potential of E and t1. The potential of t will therefore rise slightly above the potential of 2E and the valve I will then be conducting. The potential of t2 will likewise rise slightly above the potential of 3E and the valve K will also be conducting. The currents will therefore flow exactly as in the circuit of Fig. 1 when the switches are in the position shown by the dotted lines.

Referring again to the arrangement shown in Fig. 1 it will be fully evident that if the voltage of the direct current is required to be stepped-down instead of stepped-up as hereinbefore described, the source may be applied to the terminals 3E, O while energy at lower voltage may be drawn from either the two terminals O and 2E, namely at ⅔ of the voltage applied to the terminals 3E, O, or from the two terminals O and E, namely at a voltage of ⅓ of the voltage applied to the two terminals 3E and O.

When thus stepping down voltage in the manner just mentioned but with the use of thermionic or like devices instead of a mechanical switching means, it is necessary to employ the triodes or grid controlled vapor electric devices such as F and G of Fig. 2 in the different position indicated by F1 and G1 in Fig. 3 of the drawings, so that the diodes H1, I1, J1 and K1 of Fig. 3 may operate automatically in a manner similar to that described with reference to Fig. 2.

Figure 3:
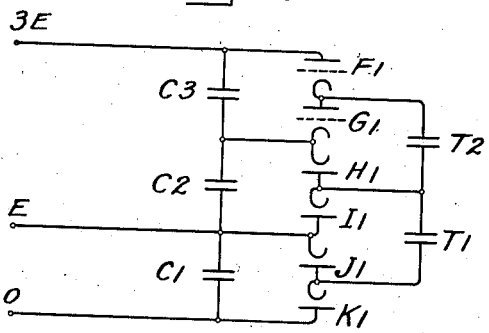
Fig. 3 is a diagram of a system similar to that shown in Fig. 2 but providing a step-down in voltage.

It will be understood that in the arrangements shown by Figs. 2 and 3 employing rectifiers such as H, I, J and K or H1, I1, J1 and K1, mechanical switching means such as S1 or S3 may replace the triodes or grid-controlled vapor electric devices F and G or F1 and G1. It will also be understood that any point of the system may be earthed so that a positive or negative high voltage may be generated or transformed to a lower voltage.

It will also be clear that the system may be made symmetrical with respect to earth potential, for example by adding beneath the system shown in Fig. 2, a similar system of rectifier valves and condensers thereby allowing also a potential of 3E to be obtained on the negative side of the system.

In the system shown in Fig. 4, the switch means is shown as comprising a switch of a well known commutator type having a shaft L of insulating material adapted to be rotated by any suitable means (not shown), this shaft supporting a number of cross conductors or brushes M making contact with plates N which are connected to the condensers, to provide the required alternate connections of the condensers T1 and T2 across the condensers C1, C2 and C3 of the potential divider. In order to operate in a vacuum the switch parts are mounted in a vitreous or other suitable chamber O which is evacuated. In Fig. 5, thermionic devices, for example F to K as in Fig. 2, constituting the switch means, are mounted in a group of aligned vitreous tubes P arranged to be evacuated. In Fig. 6 the group of potential divider condensers C1, C2 and C3 and the group of transfer condensers T1 and T2 are located in a vitreous or other suitable tube or chamber P which is evacuated. In Fig. 7 all of the condensers, as C1, C2, C3, T1 and T2, together with the switching means, for example of a commutator type such as shown in Fig. 4, are arranged in a single chamber R which is adapted to be continuously evacuated during operation.

It will be obvious that, theoretically at least, by the system of the invention direct currents may be obtained of any desired high voltage and that this high voltage may be stepped-down again, it being only necessary to employ the suitable number of potential divider condensers, transfer condensers and switching means. These condensers and switching means are constructed or designed to withstand that fraction of the high voltage which is given by dividing this high voltage by the number of condensers comprising the potential divider.

The invention is thus notably applicable for the transmission of electrical power in the form of direct current. The system of the invention may be supplied with input energy at about 100,000 volts. This input energy is conveniently obtainable by rectifying alternating current which has been stepped-up to such voltage by an alternating current transformer, or alternatively the input energy may be stepped up to such order of voltage by means of an auxiliary potential divider, transfer condenser and switching system whereby the use of high voltage transformers may be obviated. After transmission, as over long distance lines, the energy can be readily stepped-down in voltage to whatever value may be convenient.

The invention is obviously of use in making various tests such as of the breakdown voltage of insulators and other devices.

We claim:—

1. A system for the voltage transformation of direct current electrical energy, comprising a source of direct current energy, a capacitative potential divider, a part of said capacitative potential divider being adapted to have direct current energy supplied thereto from said source at a predetermined voltage, an auxiliary condenser, and switching means for alternately connecting said auxiliary condenser across one portion of said potential divider to transfer energy from said one portion to said auxiliary condenser and thereafter to transfer energy from said auxiliary condenser to another portion of said divider, so as to transfer energy along said divider whereby the direct current energy may be drawn from another part of said potential divider at a different voltage.

2. A system for the voltage transformation of direct current electrical energy, comprising a source of direct current energy, a capacitative potential divider, a part of said capacitative potential divider being adapted to have direct current energy supplied thereto from said source at a predetermined voltage, an auxiliary condenser, and switching means for alternately connecting said auxiliary condenser across one portion of said potential divider to transfer energy from said one portion to said auxiliary condenser and thereafter to transfer energy from said auxiliary condenser to another portion of said divider, so as to transfer energy along said divider whereby the direct current energy may be drawn from the whole of said potential divider at a higher voltage.

3. A system for the voltage transformation of direct current electrical energy, comprising a capacitative potential divider adapted to have direct current energy supplied to the whole thereof, an auxiliary condenser, and switching means for alternately connecting said auxiliary condenser across different parts of said potential divider so as to transfer energy along said divider whereby the direct current energy may be drawn from a part of said potential divider at a lower voltage.

4. A system for the voltage transformation of direct current electrical energy, comprising high voltage lines, lower voltage lines, a capacitative potential divider including a plurality of condensers arranged electrically in series and adapted to be connected across said high voltage lines, auxiliary condensers less in number than said first-named condensers and connected in series with one another, and switching means arranged to connect each of said auxiliary condensers alternately across each of a respective pair of adjacent condensers of said potential divider, whereby electrical energy may be transferred from each condenser of said potential divider to the next adjacent condenser thereof by means of the alternate connection of a respective auxiliary condenser across said condensers of the potential divider, and direct current electrical energy at a lower voltage may be transferred between said lower voltage lines and one of said condensers of the potential divider.

5. A system for the voltage transformation of direct current electrical energy, comprising a source of direct current energy, a capacitative potential divider adapted to have direct current energy supplied thereto from said source at a predetermined voltage, an auxiliary condenser, and switching means including a thermionic device for alternately connecting said auxiliary condenser across one portion of said potential divider to conduct energy from said one portion of the divider to said auxiliary condenser and thereafter to conduct energy from said auxiliary condenser to another portion of said divider, so as to transfer energy along said divider whereby the direct current energy may be drawn from said potential divider at a different voltage.

6. A system for the voltage transformation of direct current electrical energy, comprising high voltage lines, lower voltage lines, a capacitative potential divider including a plurality of condensers arranged electrically in series and adapted to be connected across said high voltage lines, one of said condensers being connected to said lower voltage lines, transfer condensers less in number than said first-named condensers and connected in series with one another, and switching means including a plurality of triode thermionic rectifying devices associated with said condenser connected to said lower voltage lines, whereby the direct current energy is transformed from a low voltage to a high voltage.

7. A system for the voltage transformation of direct current electrical energy, comprising high voltage lines having a plurality of high voltage terminals, lower voltage lines, a capacitative potential divider including a plurality of condensers arranged electrically in series and adapted to be connected across said high voltage lines, one of said condensers being connected to said lower voltage lines, transfer condensers less in number than said first-named condensers and connected in series with one another, and switching means including a plurality of triode thermionic rectifying devices associated with one of said first-named condensers connected to at least one of said high voltage terminals, whereby direct current energy is transformed from a high voltage to a low voltage.

8. A system for the voltage transformation of direct current electrical energy, comprising a source of direct current energy, a capacitative potential divider adapted to have direct current energy supplied to a part thereof, a transfer condenser, and means including a commutator type switch operating in vacuum for alternately connecting said transfer condenser across one portion of said potential divider to conduct energy from said one portion to said transfer condenser and thereafter to conduct energy from said transfer condenser to another portion of said divider, so as to transfer energy along said divider whereby the direct current energy may be drawn from another part of said diivder at a different voltage.

9. A system for the voltage transformation of direct current electrical energy, comprising a capacitative potential divider adapted to have direct current energy supplied to a part thereof, a transfer condenser, and switching means comprising a plurality of thermionic devices enclosed in a single evacuated tube for alternately connecting said transfer condenser across different parts of said potential divider so as to transfer energy along said divider whereby the direct current energy may be drawn from said potential divider at a different voltage.

10. A system for the voltage transformation of direct current electrical energy, comprising a capacitative potential divider adapted to have direct current energy supplied to a part thereof, said divider including a group of condensers connected in series, a group of transfer condensers, at least one of said condenser groups being within an evacuated chamber, and switching means for alternately connecting each transfer condenser across different parts of said potential divider so as to transfer energy along said divider whereby the direct current energy may be drawn from another part of said potential divider at a different voltage.

11. A system for the voltage transformation of direct current electrical energy, comprising a capacitative potential divider adapted to have direct current energy supplied to a part thereof, said divider including a group of condensers connected in series, a group of transfer condensers, each of said condensers being within a different evacuated chamber, and switching means for alternately connecting each transfer condenser across different parts of said potential divider so as to transfer energy along said divider whereby the direct current energy may be drawn from another part of said potential divider at a different voltage.

12. A system for the voltage transformation of direct current electrical energy, comprising a capacitative potential divider adapted to have direct current energy supplied to a part thereof, said divider including a plurality of condensers connected in series, at least one transfer condenser, and switching means for alternately connecting each transfer condenser across different parts of said potential divider so as to transfer energy along said divider whereby the direct current energy may be drawn from another part of said potential divider at a different voltage, said condensers and said switching means being within a single evacuated chamber.

JOHN DOUGLAS COCKCROFT.
ERNEST THOMAS SINTON WALTON.